US007249187B2

(12) United States Patent
Sobel et al.

(10) Patent No.: US 7,249,187 B2
(45) Date of Patent: Jul. 24, 2007

(54) ENFORCEMENT OF COMPLIANCE WITH NETWORK SECURITY POLICIES

(75) Inventors: William E Sobel, Stevenson Ranch, CA (US); Greg Vogel, Chatsworth, CA (US); Bruce McCorkendale, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 883 days.

(21) Appl. No.: 10/305,622

(22) Filed: Nov. 27, 2002

(65) Prior Publication Data

US 2004/0103310 A1    May 27, 2004

(51) Int. Cl.
*G06F 15/16* (2006.01)
(52) U.S. Cl. .......................... 709/229; 709/227; 726/3; 726/4
(58) Field of Classification Search ...................... None
See application file for complete search history.

(56) References Cited

U.S. PATENT DOCUMENTS

| | | |
|---|---|---|
| 5,398,196 A | 3/1995 | Chambers |
| 5,440,723 A | 8/1995 | Arnold et al. |
| 5,452,442 A | 9/1995 | Kephart |
| 5,473,769 A | 12/1995 | Cozza |
| 5,572,590 A | 11/1996 | Chess |
| 5,675,710 A | 10/1997 | Lewis |
| 5,696,822 A | 12/1997 | Nachenberg |
| 5,715,174 A | 2/1998 | Cotichini et al. |
| 5,715,464 A | 2/1998 | Crump et al. |
| 5,758,359 A | 5/1998 | Saxon |
| 5,812,763 A | 9/1998 | Teng |
| 5,826,249 A | 10/1998 | Skeirik |
| 5,832,208 A | 11/1998 | Chen et al. |
| 5,854,916 A | 12/1998 | Nachenberg |
| 5,889,943 A | 3/1999 | Ji et al. |
| 5,949,973 A | 9/1999 | Yarom |
| 5,951,698 A | 9/1999 | Chen et al. |
| 5,956,481 A | 9/1999 | Walsh et al. |

(Continued)

FOREIGN PATENT DOCUMENTS

EP    1 280 039 A    1/2003

(Continued)

OTHER PUBLICATIONS

Toth, et al "Connection-history based anomaly delection" Proceedings of the 2002 IEEE Workshop on Information Assurance and Security. West Point, NY, Jun. 17-19, 2002. pp. 30-35.

(Continued)

*Primary Examiner*—Nasser Moazzami
*Assistant Examiner*—Pramila Parthasarathy
(74) *Attorney, Agent, or Firm*—Fenwick & West LLP

(57) ABSTRACT

Methods, apparati, and computer program products enforce computer network security policies by assigning network membership to a client (105) based on the client's compliance with the security policies. When a client (105) requests (305) a network address, the DHCP proxy (110) intercepts the request and assigns (350) that client (105) a logical address on the protected network (140) if the client (105) is in compliance with the security policies. If the client (105) is not in compliance with the security policies, in various embodiments, the DHCP proxy (110) assigns (350) the client (105) an address on a restricted network (145) or no network address at all.

46 Claims, 3 Drawing Sheets

U.S. PATENT DOCUMENTS

| | | | |
|---|---|---|---|
| 5,960,170 A | 9/1999 | Chen et al. | |
| 5,974,549 A | 10/1999 | Golan | |
| 5,978,917 A | 11/1999 | Chi | |
| 5,987,524 A * | 11/1999 | Yoshida et al. | 709/245 |
| 5,987,610 A | 11/1999 | Franczek et al. | |
| 6,021,510 A | 2/2000 | Nachenberg | |
| 6,023,723 A | 2/2000 | McCormick et al. | |
| 6,052,709 A | 4/2000 | Paul et al. | |
| 6,070,244 A | 5/2000 | Orchier et al. | |
| 6,072,830 A | 6/2000 | Proctor et al. | |
| 6,072,942 A | 6/2000 | Stockwell et al. | |
| 6,088,803 A | 7/2000 | Tso et al. | |
| 6,092,194 A | 7/2000 | Touboul | |
| 6,094,731 A | 7/2000 | Waldin et al. | |
| 6,104,872 A | 8/2000 | Kubota et al. | |
| 6,108,799 A | 8/2000 | Boulay et al. | |
| 6,161,130 A | 12/2000 | Horvitz et al. | |
| 6,167,434 A | 12/2000 | Pang | |
| 6,192,379 B1 | 2/2001 | Bekenn | |
| 6,199,181 B1 | 3/2001 | Rechef et al. | |
| 6,253,169 B1 | 6/2001 | Apte et al. | |
| 6,275,938 B1 | 8/2001 | Bond et al. | |
| 6,298,351 B1 | 10/2001 | Castelli et al. | |
| 6,338,141 B1 | 1/2002 | Wells | |
| 6,347,310 B1 | 2/2002 | Passera | |
| 6,357,008 B1 | 3/2002 | Nachenberg | |
| 6,370,526 B1 | 4/2002 | Agrawal et al. | |
| 6,370,648 B1 | 4/2002 | Diep | |
| 6,505,167 B1 | 4/2002 | Agrawal et al. | |
| 6,393,484 B1 * | 5/2002 | Massarani | 709/227 |
| 6,397,200 B1 | 5/2002 | Lynch et al. | |
| 6,397,215 B1 | 5/2002 | Kreulen et al. | |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |
| 6,456,991 B1 | 9/2002 | Srinivasa et al. | |
| 6,493,007 B1 | 12/2002 | Toyama et al. | |
| 6,502,082 B1 | 12/2002 | Horvitz et al. | |
| 6,535,891 B1 | 3/2003 | Fisher et al. | |
| 6,552,814 B2 | 4/2003 | Okimoto et al. | |
| 6,611,925 B1 | 8/2003 | Spear | |
| 6,622,150 B1 | 9/2003 | Kouznetsov et al. | |
| 6,678,734 B1 | 1/2004 | Haatainen et al. | |
| 6,697,950 B1 | 2/2004 | Ko | |
| 6,721,721 B1 | 4/2004 | Bates et al. | |
| 6,748,534 B1 | 6/2004 | Gryaznov et al. | |
| 6,763,462 B1 | 7/2004 | Marsh | |
| 6,813,712 B1 | 11/2004 | Luke | |
| 6,851,057 B1 | 2/2005 | Nachenberg | |
| 6,910,134 B1 | 6/2005 | Maher et al. | |
| 2002/0004908 A1 | 1/2002 | Galea | |
| 2002/0025031 A1 * | 2/2002 | Maeda et al. | 379/355.04 |
| 2002/0035693 A1 | 3/2002 | Eyres et al. | |
| 2002/0035696 A1 | 3/2002 | Thacker | |
| 2002/0038308 A1 | 3/2002 | Cappi | |
| 2002/0046275 A1 | 4/2002 | Crosbie et al. | |
| 2002/0073046 A1 | 6/2002 | David | |
| 2002/0083175 A1 | 6/2002 | Afek et al. | |
| 2002/0087649 A1 | 7/2002 | Horvitz | |
| 2002/0091940 A1 | 7/2002 | Wellborn et al. | |
| 2002/0138525 A1 | 9/2002 | Karadimitriou et al. | |
| 2002/0147694 A1 | 10/2002 | Dempsey et al. | |
| 2002/0147782 A1 | 10/2002 | Dimitrova et al. | |
| 2002/0157008 A1 | 10/2002 | Radatti | |
| 2002/0162015 A1 | 10/2002 | Tang | |
| 2002/0178374 A1 | 11/2002 | Swimmer et al. | |
| 2002/0178375 A1 | 11/2002 | Whittaker et al. | |
| 2002/0194488 A1 | 12/2002 | Cormack et al. | |
| 2002/0199186 A1 | 12/2002 | Ali et al. | |
| 2002/0199194 A1 | 12/2002 | Ali | |
| 2003/0023865 A1 | 1/2003 | Cowie et al. | |
| 2003/0033587 A1 | 2/2003 | Ferguson et al. | |
| 2003/0051026 A1 | 3/2003 | Carter et al. | |
| 2003/0065926 A1 | 4/2003 | Schultz et al. | |
| 2003/0115458 A1 | 6/2003 | Song | |
| 2003/0115479 A1 | 6/2003 | Edwards et al. | |
| 2003/0115485 A1 | 6/2003 | Milliken | |
| 2003/0120951 A1 | 6/2003 | Gartside et al. | |
| 2003/0126449 A1 | 7/2003 | Kelly et al. | |
| 2003/0140049 A1 | 7/2003 | Radatti | |
| 2003/0191966 A1 | 10/2003 | Gleichauf | |
| 2003/0212902 A1 | 11/2003 | van der Made | |
| 2003/0236995 A1 | 12/2003 | Fretwell, Jr. | |
| 2004/0015712 A1 | 1/2004 | Szor | |
| 2004/0015726 A1 | 1/2004 | Szor | |
| 2004/0030913 A1 | 2/2004 | Liang et al. | |
| 2004/0039921 A1 | 2/2004 | Chuang | |
| 2004/0158730 A1 | 8/2004 | Sarkar | |
| 2004/0162808 A1 | 8/2004 | Margolus et al. | |
| 2004/0181687 A1 | 9/2004 | Nachenberg et al. | |
| 2005/0021740 A1 | 1/2005 | Bar et al. | |
| 2005/0044406 A1 | 2/2005 | Stute | |
| 2005/0132205 A1 | 6/2005 | Palliyil et al. | |
| 2005/0177736 A1 | 8/2005 | De los Santos et al. | |
| 2005/0204150 A1 | 9/2005 | Peikari | |
| 2006/0064755 A1 | 3/2006 | Azadet et al. | |

FOREIGN PATENT DOCUMENTS

| | | |
|---|---|---|
| GB | 2 364 142 A | 1/2002 |
| WO | WO 97/39399 A | 10/1997 |
| WO | WO 01/91403 A | 11/2001 |
| WO | WO 02/05072 A | 1/2002 |

OTHER PUBLICATIONS

Kephart, Jeffrey et al., "An Immune System For Cyberspace", IBM Thomas J. Watson Research Center, IEEE 1997, pp. 879-884.

Symantec Corporation, "Norton AntiVirus Corporate Edition", 1999, Version 1, pp. 15, 22.

Bakos et al., "Early Detection of Internet Work Activity by Metering ICMP Destination Unreachable Activity.", Proc. Of SPIE Conference on Sensors, and Command, Control, Communications and Intelligence, Orlando, Apr. 2002.

Parkhouse, Jayne, "Pelican SafeTNet 2.0", [online] Jun. 2000, SC Magazine Product Review, [retrieved Dec. 1, 2003] Retrieved from the Internet: <URL: http://www.scmagazine.com/standalone/pelican/sc_pelican.html>.

Szor, P. and Ferrie, P., "Hunting for Metamorphic", Virus Bulletin Conference, Sep. 2001, Virus Bulletin Ltd., The Pentagon, Abingdon, Oxfordshire, England, pp. 123-144.

"News Release—Symantec Delivers Cutting-Edge Anti-Virus Technology with Striker32", Oct. 1, 1999, 2 pages, [online]. Retrieved on Nov. 11, 2003. Retrieved from the Internet:<URL:http://www.symantec.com/press/1999/n991001.html>. Author unknown.

Burchell, Jonathan, "NetShield 1.5", Virus Bulletin, Aug. 1994, pp. 21-23, XP 000617453.

Szor, P. and Ferrie, P., Attacks on Win32, Virus Bulletin Conference, Sep. 1998, Virus Bulletin Ltd., The Pentagon, Abingdon, Oxforshire, England, pp. 57-84.

Szor, P. and Ferrie, P., "Attacks in Win32 Part II", Virus Bulletin Conference, Sep. 2000, Virus Bulletin Ltd., The Pentagon, Abingdon, Oxfordshire, England, pp. 47-68.

Delio, M., "Virus Throttle a Hopeful Defense", Wired News, Dec. 9, 2002, retrieved from Internet Http://www.wired.com/news/print/0,1294,56753,00.html Jan. 7, 2003.

"System File Protection and Windows ME", [online], last updated Dec. 4, 2001, [retrieved on Apr. 9, 2002] Retrieved from the Internet:<URL: http://www.Microsoft.com/hwdev/archives/sfp/winME_sfpP.asp>.

"Description of Windows 2000 Windows File Protection Feature (Q222193)", [online], first published May 26, 1999, last modified Jan. 12, 2002, [retrieved on Apr. 9, 2002] Retrieved from the Internet <URL: http://support.microsoft.com/default.aspx?scid=kb:EN-US;q222193>.

"Software: Windows ME; Windows ME and System File Protection", [online] last updated Mar. 11, 2002, [retrieved on Apr. 9, 2002] Retrieved from the Internet: <URL: http//www.wackyb.co.nz/mesfp.html>.

Morar, J. E. and Chess, D. M., "Can Cryptography Prevent Computer Viruses?", Virus Bulletin Conference 2000, Sep. 2000, pp. 127-138, Virus Bulletin Ltd., Oxfordshire, England.

Wikipedia.org web pages [online], Wikipedia, [retrieved Mar. 17, 2003] Retrieved from the Internet: <ULR: http://www.wikipedia.org/w/wiki.phintl?title=machine learning and printable=yes>.

Outlook.spambully.com web pages [online] Spam Bully [retrieved Jan. 16, 2003] Copyright 2002, Retrieved from the Internet <URL: http://outlook.spambully.com/about.php>.

"Enterprise Protection Strategy" [online] Trend Micro Inc. [retrieved Dec. 3, 2002] Retrieved from the Internet: <URL: http://www.trendmicro.com/en/products/eps/features.htm>.

"How to Test Outbreak Commander", :Trend Micro Inc., Aug. 2002, pp. 1-13, Cupertino, CA.

Szor, P., "Memory Scanning Under WIndows NT", Virus Bulletin Conference, Sep. 1999, Virus Bulletin Ltd., The Pentagon, Abingdon, Oxfordshire, England, pp. 1-22.

Choi, Yang-Seo, et al., "A New Stack Buffer Overflow Hacking Defense Technique with Memory Address Confirmation", Lecture Notes in Computer Science 2288, 2002, pp. 146-159, Springer Verlog, Berlin and Heidelsberg, Germany.

Chew, Monica and Dawn Song, "Mitigating Buffer Overflows by Operating System Randomization", Dec. 2000, pp. 1-9, U.C. Berkeley, CA USA.

Randustack web pages [online]. Virtualave.net [first retrieved May 1, 2003]. Retrieved from the Internet: <URL: http://pageexec.virualave.net/docs/randustack.txt>, copy retrieved Mar. 21, 2005 from <http://www.pax.grsecurity.net/docs/randustack.txt>.

Randkstack web pages [online]. Virtualave.net [first retrieved May 1, 2003]. Retrieved from the Internet: <URL: http://pageexec.virualave.net/docs/randkstack.txt>, copy retrieved Mar. 21, 2005 from <http://www.pax.grsecurity.net/docs/randkstack.txt>.

Randmap web pages [online]. Virtualave.net [first retrieved May 1, 2003]. Retrieved from the Internet: <URL: http://pageexec.virualave.net/docs/randmap.txt>, copy retrieved Mar. 21, 2005 from <http://www.pax.grsecurity.net/docs/randmap.txt>.

Randexec web pages [online]. Virtualave.net [first retrieved May 1, 2003]. Retrieved from the Internet: <URL: http://pageexec.virualave.net/docs/randexec.txt>, copy retrieved Mar. 21, 2005 from <http://www.pax.grsecurity.net/docs/randexec.txt>.

VMA Mirroring web pages [online]. Virtualave.net [retrieved May 1, 2003]. Retrieved from the Internet: <URL: http://pageexec.virualave.net/docs/vmmirror.txt>, copy retrieved Mar. 21, 2005 from <http://www.pax.grsecurity.net/docs/vmmirror.txt>.

Aho, Alfred V., et al. Compilers, Addison-Wesly Publishing Company, USA, revised edition 1988, pp. 585-598, 633-648.

Periot, Frederic, "Defeating Polymorphism Through Code Optimization", Paper given at the Virus Bulletin conference, Sep. 26-27 Oct. 2003 pp. 142-159, Toronto, Canada, published by Virus Bulletin Ltd., The pentagon, Abington, Oxfordshire, England.

Bolosky, W., Corbin, S., Goebel, D., and Douceur, J., "Single Instance Storage in Windows 2000", Microsoft Research, Balder Technology Group, Inc., [online] [retrieved Oct. 11, 2002] Retrieved from the Internet <URL: http://research.microsoft.com/sn/farsite/wss2000.pdf>.

* cited by examiner

ENFORCEMENT OF COMPLIANCE WITH NETWORK SECURITY POLICIES

TECHNICAL FIELD

This invention pertains to the field of enforcing compliance with computer network security policies, and in particular to assigning network access to a client computer based on the client's compliance with the security policies.

BACKGROUND ART

A major task for computer network administrators is to enforce the security policies associated with their corporate networks. In some instances, enforcing a corporate network's security policies mandates that each client having access to the network comply with the security policies for that network. Many existing systems designed to enforce network security policies require pre-installation of software or other pre-configuration steps to be performed on a client machine before the client is allowed access to the corporate network. These management schemes require a heavy interaction between each client and the network administration staff and, therefore, are expensive and inconvenient. In reality, a corporate network is an environment in which the users change frequently. These users, such as contractors, visitors, and even employees, need to manage their own machines and need to connect their machines to the corporate network with minimal or no interaction by the network administration staff.

A useful tool for environments in which users change frequently is the Dynamic Host Configuration Protocol (DHCP). DHCP is a communications protocol that lets network administrators centrally manage and automate the assignment of Internet Protocol (IP) addresses in an organization's network. Each client must be assigned a unique IP address before it can connect to the Internet using the Internet Protocol. These unique IP addresses are provided by the organization that maintains the network. Without DHCP, the IP addresses are entered manually at each computer and, if computers move to another location in another part of the network, a new IP address must be entered. Accordingly, DHCP lets a network administrator supervise and distribute IP addresses from a central point and automatically send a new IP address when a computer is plugged into a different physical location in the network.

It is desirable to allow arbitrary machines that are minimally configured for any basic network access to be coupled to a corporate or other private network and assigned a level of access to the network based on their compliance with the network's security policies. It is further desirable to enforce security policies while minimizing the time required of network administration staff to enforce those policies.

DISCLOSURE OF INVENTION

The present invention comprises methods, apparati, and computer program products for enforcing a set of security policies for a protected network (140) by assigning network access to a client (105) based on the client's compliance with the security policies.

In one embodiment, a protected network (140) is associated with a set of security policies. A compliance registration manager (135) stores (220) compliance data associated with a plurality of clients (105), where the compliance data for each client (105) indicates whether the client (105) is in compliance with the set of security policies. A DHCP proxy (110) is coupled to the compliance registration manager (135) for retrieving (310) each client's compliance data. When a client (105) requests (305) a network address, the DHCP proxy (110) intercepts the request and assigns (350) that client (105) a logical address on the protected network (140) if the client (105) is in compliance with the security policies. If the client (105) is not in compliance with the security policies, in various embodiments, the DHCP proxy (110) assigns (350) the client (105) an address on a restricted network (145) or no network address at all.

BRIEF DESCRIPTION OF THE DRAWINGS

These and other more detailed and specific objects and features of the present invention are more fully disclosed in the following specification, reference being had to the accompany drawings, in which.

DETAILED DESCRIPTION OF THE PREFERRED EMBODIMENTS

Figure 1:
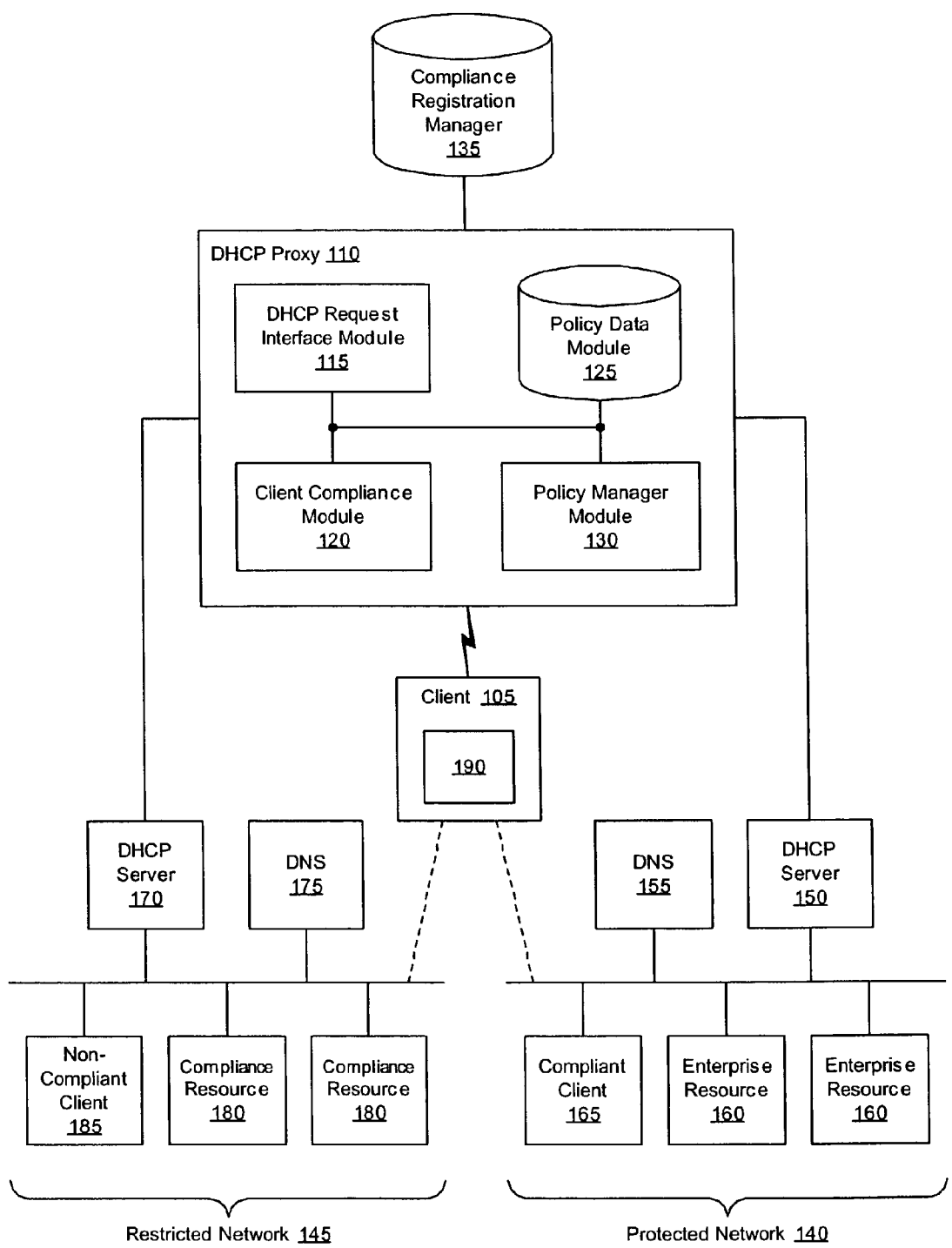
FIG. 1 is a diagram of a system according to an embodiment of the invention.

FIG. 1 shows a system for enforcing a set of computer network security policies. In the embodiment shown, the system includes a DHCP proxy 110, a compliance registration manager 135, a client 105, and a protected network 140. In addition, the system optionally includes one or more restricted networks 145. In practice, for example, the protected network 140 is a corporate network that allows users to communicate and share information inside the protection of a corporate firewall. Typically, an administrator for the corporate network will outline a set of security policies with which users of the network must comply, e.g., by properly configuring their client 105 machines. Accordingly, given a set of security policies associated with the protected network 140, the system allows the network administrator to enforce compliance with the security policies by each client 105 that accesses the protected network 140. In one embodiment, the system enforces these security policies by assigning a client 105 to the protected network 140 or a restricted network 145 based on whether the client 105 is in compliance with the security policies.

As used herein, the term client 105 is understood to be any type of computer, which includes computer systems, personal data assistants (PDAs), portable phones, and/or any other digital device capable of communicating with devices over a network. In addition, the term network, including protected and restricted networks 140,145 referred to herein, is broadly understood to include any computer network that allows for communications between any types of computer.

The protected network 140 includes a DHCP server 150, a domain name server (DNS) 155, and a set of enterprise resources 160. In a typical implementation, the enterprise resources 160 include resources such as a corporate intranet, licensed software, shared storage, and an email server. In contrast, connected to the restricted network 145, a non-compliant client 185 does not have access to the enterprise resources 160. The restricted network 145 includes a DHCP server 170 and a DNS 175. In addition, the restricted network 145 provides access only to a set of compliance resources 180. These compliance resources 180 include some or all of the resources that a non-compliant client 185 needs to become in compliance with the security policies. Such resources 180 include without limitation anti-virus software and virus definitions, personal firewall software, client software, software updates, and network configuration settings. In addition, although separate DHCP servers 150, 170 and DNSs 155,175 are shown for the protected and restricted networks 140,145, respectively, these components may actually be implemented in the same systems.

In one embodiment, each of the protected network 140 and the restricted network 145 is a logical network that may or may not share the same or a portion of the same physical network. Separate logical networks can be implemented as virtual local area networks (VLANs). A VLAN is a logical subgroup within a local area network that is created by software rather than physical connections. A VLAN combines user stations and network devices into a single unit regardless of the physical LAN segment they are attached to and allows traffic to flow more efficiently within populations of mutual interest. Importantly, the use of VLANs allows the network administrators to divide an enterprise's physical network resources into separate logical networks for segregating compliant clients 105 based on their compliance with the security policies.

The DHCP proxy 110 is used to segregate compliant clients 165 from non-compliant clients 185 so that the protected network 140 is protected from the risks of security policy violations. The DHCP proxy 110 operates by assigning network access to a client 105 based on the client's compliance with the security policies. The DHCP proxy 110 comprises a DHCP request interface module 115, a client compliance module 120, a policy data module 125, and a policy manager module 130, each module coupled to one another. As used herein, a module may be implemented in hardware, software, firmware, or any combination thereof. In addition, any of the modules or a portion thereof may be stored and/or executed by a remote device coupled to any part of the system. The DHCP proxy 110 may be implemented in a network appliance (such as a router, a switch, or a network firewall device), in a DHCP server itself, or in a software program coupled to the networks 140,145.

The security policies are definable by the network administrator. In one embodiment, the security policies are rules based, which allows them to be created and modified easily. These policies may include rules related to proper configuration of software on the client (including enabling of particular features and specifying values for settings thereon), installation on the client of security software or other software programs (including anti-virus software and personal firewall software), updates for the security software or other software programs (including versions of the software), and virus definitions. Additionally, the security policies can be configured to enforce software license agreements, where the security policies include rules related to installation on the client of licensed software and available site licenses for the licensed software. Definitions for the security policies can be stored electronically for access by any system component that requires them. In one embodiment, the security policies are stored in the policy data module 125 of the DHCP proxy 110. The policy manager module 130 is responsible for updating the security policies in the policy data module 125 and transmitting the updated policies to the clients 105. The security policies may also be stored on each client 105.

The compliance registration manager 135 is capable of storing the compliance data for a number of clients. The compliance data for each client 105 indicates the identity of the client 105 and whether the client 105 is in compliance with the security policies. In one embodiment, each client is identified by a media access control (MAC) address associated with the client. In addition to storing this compliance data, the compliance registration manager 135 accepts queries for a client's compliance (e.g., based on the client's MAC address), and returns the compliance status for the client 105. The compliance registration manager 135 also accepts commands for updating compliance data entries and creating new ones. In one embodiment, the compliance data comprises whether the client is in compliance with the set of security policies, and a media access control (MAC) address associated with the client.

The system includes a compliance verification component 190, which can be implemented as a computer program that runs on the client 105. The compliance verification component 190 uses the security policies to determine whether the client 105 is in compliance with the policies. The compliance verification component 190 may be provided with a static set of security policies, or the security policies can be stored in an updateable store that queries the policies from a central store. Such a query can be performed in one example using the Lightweight Directory Access Protocol (LDAP), which is used to access directory listings and is supported by directory products such as Directory Server by Sun Microsystems and Active Directory by Microsoft. Alternatively, the compliance verification component 190 can be adapted to obtain the security policies (e.g., from the policy data module 125 of the DHCP proxy 110), without storing the policies on the client system 105.

Figure 2:
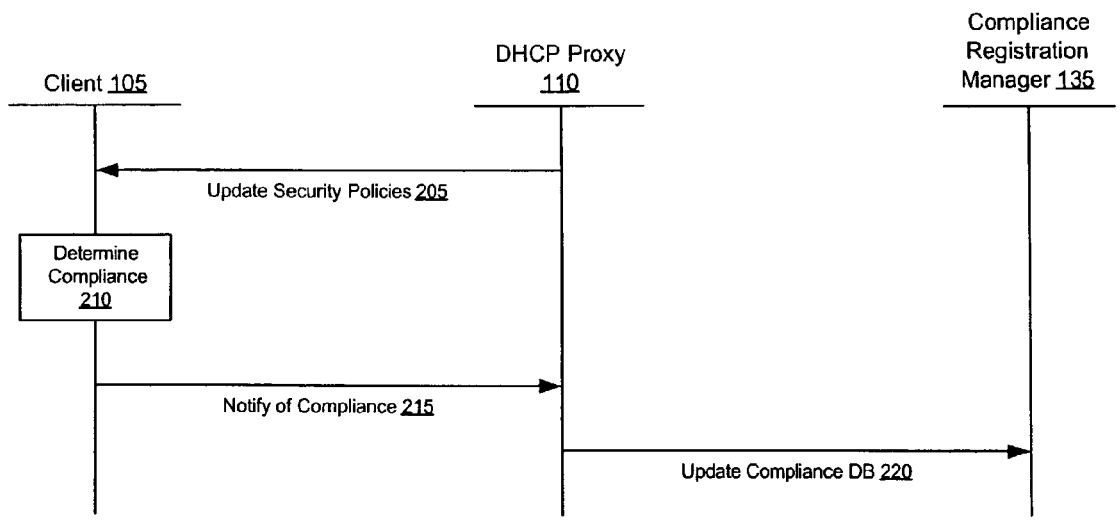
FIG. 2 is a timing diagram of a process for updating a client's compliance data according to one embodiment.

FIG. 2 shows a process for updating a client's compliance data according to one embodiment of the invention. Optionally, before the compliance data for a client is determined, the compliance verification component 190 is provided a current version of the security policies. Thereafter, the compliance verification component 190 determines 210 whether the client is in compliance with the security policies. This step 210 may be performed at any time a network administrator determines appropriate. For example, the compliance verification component 190 can be configured to determine 210 compliance in response to a request from the DHCP proxy 110 for the client's compliance data. Alternatively, step 210 can be performed at predetermined time intervals, upon startup of the client 105, or upon DHCP requests, in response to various events (e.g., every load of system software), or a combination thereof (e.g., after a day if no reload occurred within a day).

Once the compliance verification component 190 determines 210 whether the client is in compliance, the client notifies 215 the DHCP proxy 110 by transmitting its compliance data. As explained above, the compliance data identifies the client 105 and whether it is in compliance. In one embodiment, the client 105 is associated with one or more MAC addresses. For example, the client 105 may be a computer system having a network card installed, where the network card has a MAC address. The MAC address operates as a globally unique serial number, so it is well suited for identifying a client system 105. The DHCP proxy 110 then updates 220 the compliance data for the client 105 with the compliance registration manager 135.

Figure 3:
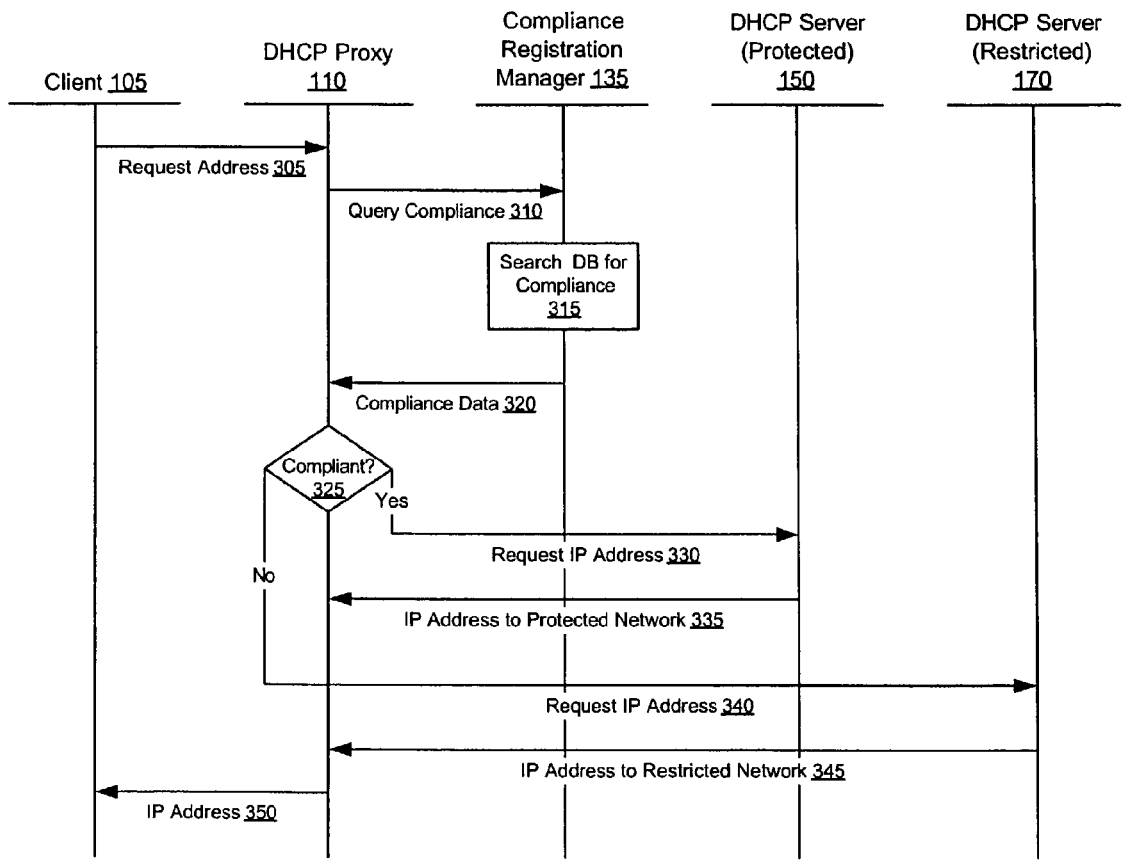
FIG. 3 is a timing diagram of a process for assigning a network address to a client according to one embodiment.

FIG. 3 illustrates a process for assigning a network address to a client according to one embodiment. This process is described in the context of requesting an IP address using the DHCP; however, the invention is not limited to this protocol. Rather, an embodiment of the invention is understood to enable the enforcement of network security policies by assigning network access based on a client's compliance with the policies, regardless of any particular implementation. The DHCP and use of one or more VLANs are just suitable tools for assigning network access to clients.

As explained above, a client 105 that does not have a static IP address can access a network by requesting 305 an IP address from a DHCP server for the network. The DHCP proxy 110 is configured to intercept the DHCP request 305 from the client 105. Before providing the client 105 with an IP address, the DHCP proxy 110 first queries 310 the compliance registration manager 135 for the compliance data associated with the client 105. This query includes an identifier for the particular client 105. In one embodiment, this client-specific identifier is the client's MAC address, which is normally included in a DCHP request packet and thus available to the DHCP proxy 110.

In response to the query 310, the compliance registration manager 135 searches 315 its database for an entry corresponding to the requesting client 105. If the entry is found, the compliance registration manager 135 returns 320 the compliance status that corresponds to the entry to the DHCP proxy 110. If an entry for the requesting client is not found, the client is treated as not compliant. Accordingly, the compliance registration manager 315 returns 320 a "not compliant" status associated with the requesting client 105. Alternatively, if an entry for the requesting client is not found, the compliance registration manager 315 may request that the client 105 determine its compliance (e.g., according to the process of FIG. 2). In such a case, the compliance registration manager 135 waits until it receives the compliance data from the client 105 or until a timeout occurs before returning 320 the client's compliance data to the DHCP proxy 110.

If 325 the requesting client 105 is compliant with the security policies, the DHCP proxy 110 requests 330 an IP address from the DHCP server 150 on the protected network 140, which then returns 335 an IP address to the DHCP proxy 110 if one is available. If 325 the requesting client 105 is not compliant with the policies, or if the client 105 is compliant but no IP address on the protected network 140 is available, the DHCP proxy 110 requests 340 an IP address from the DHCP server 170 on the restricted network 145. This DHCP server 170 then returns 345 an IP address associated with the restricted network, if any are available. In the event that no IP addresses were available, the client 105 cannot access any network 140,145, but the client 105 may repeat this requesting process at a later time.

The DHCP proxy 110 then provides 350 the requesting client 105 with the obtained IP address. Using this address in accordance with the DHCP, the client 105 accesses either the protected network 140 or the restricted network 145, depending on the address obtained. Accordingly, the result of this process is that if the client 105 is compliant with the security policies (according to the latest compliance data in the compliance registration manager 315), the client 105 is assigned to the protected network 140 if an address for that network 140 is available. Otherwise, the client 105 is assigned to the restricted network 145, or the client's DHCP request is denied.

In some cases, the network administrators may not be able to implement a VLAN or otherwise enable logically separate networks. Accordingly, an embodiment of the invention includes a protected network 140 only. In such a case, a client 105 that is determined to not be in compliance with the security policies is not assigned any network address, and therefore that client 105 would have no network access. Alternatively, the DHCP proxy 110 is configured to provide very short-term address leases on the protected network 140 to non-compliant clients 185. This short-term lease is useful for system in which the creation of a restricted network 145 is not feasible, as it allows a client 105 to use the protected network 140 for a short time to comply with the security policies.

In another variation of the process shown in FIG. 3, a number of restricted networks 145 are provided. In one embodiment, each client 105 that is determined to be non-compliant is assigned to its own restricted network 145. Although this requires that the system support a large number of logical networks, e.g., VLANs, it provides the added benefit of protecting non-compliant clients 185 from each other. For example, some clients 185 might be non-compliant for relatively minor infractions of the security policies, while others might be much more susceptible to attacks by malicious code due to major infractions. Shielding non-compliant clients 185 from each other thus provides an added protection.

In another embodiment, a client 105 is automatically assigned to the restricted network 145 (e.g., upon startup) and thereafter may request access to the protected network 140 (which request is granted only if the client 105 is compliant with the security policies). This is implemented, for example, by configuring the DHCP proxy 110 to retrieve an address on the restricted network 145 responsive to the client's first DHCP request. Accordingly, the client 105 is assigned to the restricted network 145 regardless of its compliance with the policies. The DHCP proxy 110 obtains the address on the restricted network 145 from that network's DCHP server 170. The DHCP proxy 110 provides the client 105 with that address, giving the client 105 access to the restricted network 145 only. Thereafter, the client 105 may request an IP address on the protected network 140 by making another DHCP request. This request is also intercepted by the DHCP proxy 110, which retrieves an address from the DHCP server 150 for the protected network 140 if the client 105 is determined to be in compliance with the security policies. Otherwise, the DHCP proxy 110 denies the request, and the client 105 continues to use the address on the restricted network 145 that was originally obtained.

Figure 4:
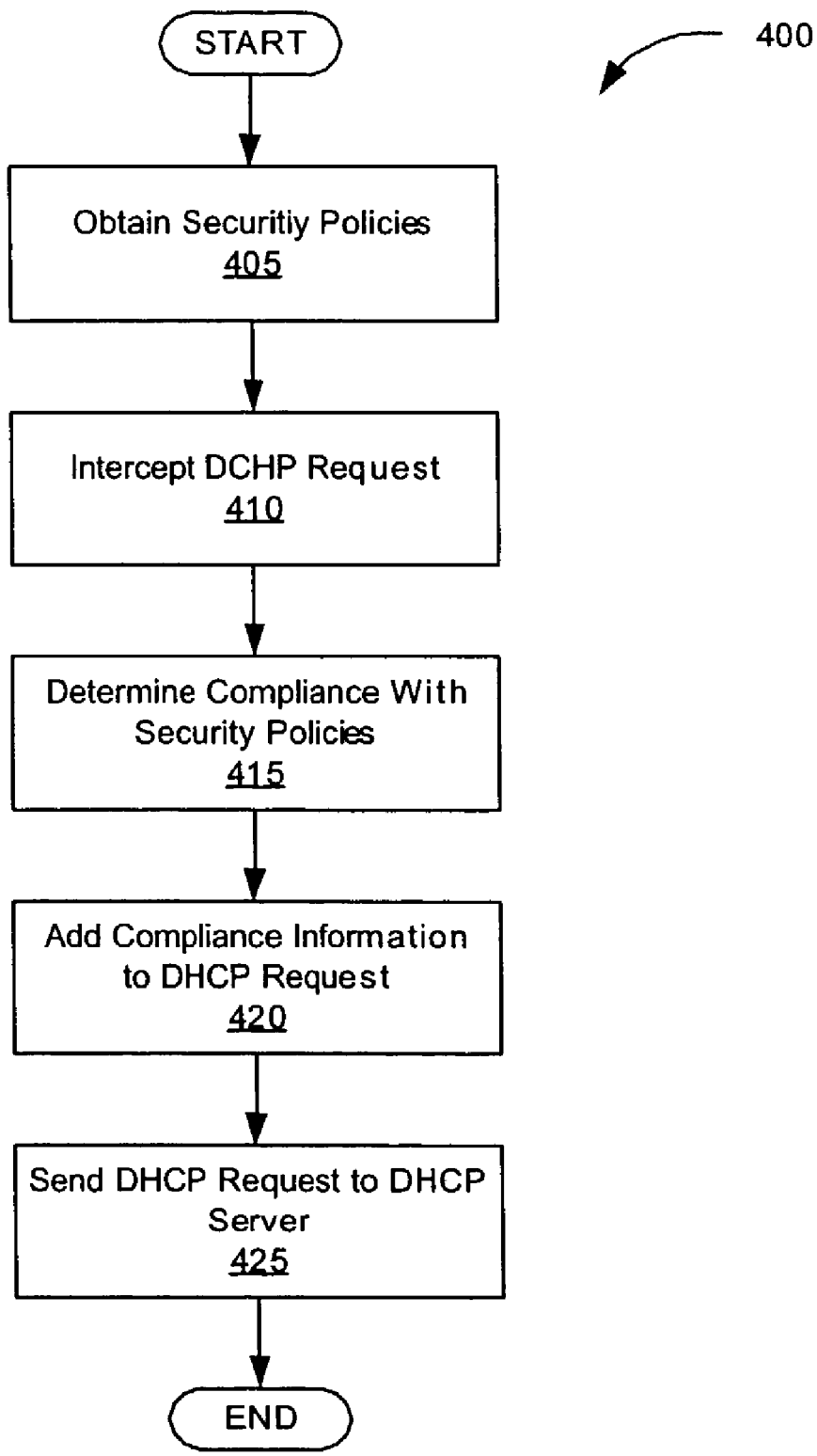
FIG. 4 is a flow diagram of a process for requesting a network address by a client according to another embodiment.

FIG. 4 shows a client-based embodiment of a process for requesting a network address by a client 105 according to another embodiment. In this process, the compliance verification component 190 runs on the client computer 105 and performs the steps of FIG. 4. In this embodiment, the compliance verification component 190 first obtains 405 the security policies, available for example from the policy data module 125 of the DHCP proxy 110. The component 190 can store these security policies and periodically update them, or it can obtain 405 the policies immediately before performing this process When the client system 105 makes a DHCP request over its network connection, the component 190 intercepts 410 this request. The component 190 can use any suitable method to intercept 410 the request, including using Libpcap functions to "hook" the network stack, implementing a network card shim, hooking the TDI layer, using MICROSOFT Firewall APIs or proprietary APIs, replacing Winsock, and implementing a Winsock-layered provider. It can be appreciated that a variety of known techniques for intercepting 410 DHCP requests are possible and are within the scope of the present invention.

Using these security policies, the component 190 determines 415 whether the client 105 is in compliance with the policies. Alternatively, this determination may be performed periodically (e.g., before any DHCP request), and the compliance data are stored, e.g., on the client 105. Then, this step 415 can be performed quickly by merely checking the stored compliance data, rather than checking the security policies against the client 105 only after a DHCP request. This might be useful where the rule defining the security policies are extensive, as it helps to reduce the delay between a DHCP request and the client's obtaining an actual IP address.

Using the obtained compliance data for the client 105, the component 190 adds 420 the compliance data to the DHCP request. Modifying the DHCP request can be performed, e.g., by modifying the corresponding packet on the network stack. This modified DHCP request is then sent 425 to a DHCP server by way of the DHCP proxy 110. Alternatively, the component 190 can send a separate packet that contains the client's compliance data. The DHCP proxy 110 is configured to route the DHCP request to a DHCP server 150,170 on the protected or restricted network 140,145, depending on whether the client is in compliance with the security policies. Accordingly, the client 105 will be given an IP address on the protected network 140 (and thus access thereto) if the client 105 is in compliance; otherwise, the client 105 will only have access to a restricted network 145 or none at all.

The above description is included to illustrate the operation of various embodiments of the invention and is not meant to limit the scope of the invention. The scope of the invention is to be limited only by the following claims. Accordingly, from the above discussion, many variations will be apparent to one skilled in the art that would yet be encompassed by the spirit and scope of the present invention.

What is claimed is:

1. A computer-implemented method for enforcing a set of security policies associated with a protected network, the method comprising the steps of:
   receiving a request for a network address from a client;
   determining whether the client is in compliance with the set of security policies, wherein the set of security policies includes at least one rule that evaluates a client's compliance based on a configuration of the client; and
   responsive to the client's being in compliance with the set of security policies, assigning the client a logical address on the protected network.

2. The method of claim 1, further comprising the step of:
   responsive to the client's not being in compliance with the set of security policies, denying the client's request for a network address.

3. The method of claim 1, further comprising the step of:
   responsive to the client's not being in compliance with the set of security policies, assigning the client a logical address on a restricted network.

4. The method of claim 3, wherein the restricted network provides access to a number of resources necessary for complying with the set of security policies.

5. The method of claim 1, wherein determining whether the client is in compliance with the set of security policies comprises retrieving compliance data for the client from a database, the compliance data indicating whether the client is in compliance with the set of security policies.

6. The method of claim 1, wherein the set of security policies includes one or more rules related to installation on the client of security software, including at least one of: anti-virus software and personal firewall software.

7. The method of claim 6, wherein the set of security policies further includes one or more rules related to an update for the security software.

8. The method of claim 1, wherein the set of security policies include rules related to:
   installation on the client of licensed software; and
   available site licenses for the licensed software.

9. The method of claim 1, further comprising the step of:
   responsive to receiving a first request for a network address from the client, assigning the client a logical address on a restricted network.

10. The method of claim 1, wherein the set of security policies further includes one or more rules related to a configuration of software on the client.

11. A computer-implemented method for enforcing a set of security policies associated with a protected network, the method comprising the steps of:
    receiving compliance data indicating whether a client is in compliance with the set of security policies, wherein the set of security policies includes at least one rule that evaluates a client's compliance based on a configuration of the client;
    storing the compliance data for later access;
    responsive to a DHCP request for an IP address from the client, retrieving the compliance data related to the client; and
    responsive to the retrieved compliance data's indicating that the client is in compliance with the set of security policies, assigning the client a logical address on the protected network.

12. The method of claim 11, further comprising the step of:
    responsive to the retrieved compliance data's indicating that the client is not in compliance with the set of security policies, denying the client's DHCP request for an IP address.

13. The method of claim 11, further comprising the step of:
    responsive to the retrieved compliance data's indicating that the client is not in compliance with the set of security policies, assigning the client a logical address on a restricted network.

14. The method of claim 13, wherein the restricted network provides access to a number of resources necessary for complying with the set of security policies.

15. The method of claim 13, further comprising the step of:
    responsive to receiving a DHCP request from a second non-compliant client, assigning the second non-compliant client a logical address on a second restricted network.

16. The method of claim 11, wherein the protected network is a virtual local area network (VLAN).

17. The method of claim 11, wherein the compliance data includes:
    whether the client is in compliance with the set of security policies; and
    a media access control (MAC) address associated with the client.

18. The method of claim 11, wherein the set of security policies includes one or more rules related to installation on the client of security software, including at least one of: anti-virus software and personal firewall software.

19. The method of claim 18, wherein the set of security policies further includes one or more rules related to an update for the security software.

20. The method of claim 11, further comprising the steps of:
receiving an updated set of security policies; and
transmitting the updated set of security policies to the client.

21. The method of claim 11, wherein the set of security policies further includes one or more rules related to a configuration of software on the client.

22. A computer program product comprising a computer-readable medium containing computer program code for enforcing a set of security policies associated with a protected network, the computer program code comprising instructions for performing the steps of:
receiving a request for a network address from a client;
determining whether the client is in compliance with the set of security policies, wherein the set of security policies includes at least one rule that evaluates a client's compliance based on a configuration of the client; and
responsive to the client's being in compliance with the set of security policies, assigning the client a logical address on the protected network.

23. The computer program product of claim 22, the computer program code further comprising instructions for performing the step of:
responsive to the client's not being in compliance with the set of security policies, denying the client's request for a network address.

24. The computer program product of claim 22, the computer program code further comprising instructions for performing the step of:
responsive to the client's not being in compliance with the set of security policies, assigning the client a logical address on a restricted network.

25. The computer program product of claim 22, wherein the set of security policies includes one or more rules related to installation on the client of security software, including at least one of: anti-virus software and personal firewall software.

26. The computer program product of 25, wherein the set of security policies further includes one or more rules related to an update for the security software.

27. The computer program product of claim 22, the computer program code further comprising instructions for performing the step of:
responsive to receiving a first request for a network address from the client, assigning the client a logical address on a restricted network.

28. The computer program product of 22, wherein the set of security policies further includes one or more rules related to a configuration of software on the client.

29. A computer program product comprising a computer-readable medium containing computer program code for enforcing a set of security policies associated with a protected network, the computer program code comprising instructions for performing the steps of:
receiving compliance data indicating whether a client is in compliance with the set of security policies, wherein the set of security policies includes at least one rule that evaluates a client's compliance based on a configuration of the client;
storing the compliance data for later access;
responsive to a DHCP request for an IP address from the client, retrieving the compliance data related to the client; and
responsive to the retrieved compliance data's indicating that the client is in compliance with the set of security policies, assigning the client a logical address on the protected network.

30. The computer program product of claim 29, the computer program code further comprising instructions for performing the step of:
responsive to the retrieved compliance data's indicating that the client is not in compliance with the set of security policies, denying the client's DHCP request for an IP address.

31. The computer program product of claim 29, the computer program code further comprising instructions for performing the step of:
responsive to the retrieved compliance data's indicating that the client is not in compliance with the set of security policies, assigning the client a logical address on a restricted network.

32. The computer program product of claim 31, the computer program code further comprising instructions for performing the step of:
responsive to receiving a DHCP request from a second non-compliant client, assigning the second non-compliant client a logical address on a second restricted network.

33. The computer program product of claim 29, wherein the compliance data includes:
whether the client is in compliance with the set of security policies; and
a media access control (MAC) address associated with the client.

34. The computer program product of claim 29, wherein the set of security policies includes one or more rules related to installation on the client of security software, including at least one of: anti-virus software and personal firewall software.

35. The computer program of claim 34, wherein the set of security policies further includes or more rules to an update for the security software.

36. The computer program product of claim 29, wherein the set of security policies further includes one or more rules related to a configuration of software on the client.

37. A DHCP proxy device for enforcing a set of security policies associated with a protected network, the proxy device comprising:
a DHCP request interface module configured to receive a DHCP request for an IP address from a client; and
a client compliance module coupled to the DHCP request interface module, the client compliance module configured to retrieve, responsive to the DHCP request, compliance data, the compliance data indicating whether the client is in compliance with the set of security policies, wherein the set of security policies includes at least one rule that evaluates a client's compliance based on a configuration of the client;
wherein, responsive to the retrieved compliance data's indicating that the client is in compliance with the set of security policies, the DHCP request interface module assigns the client a logical address on the protected network.

38. The proxy device of claim 37, wherein the DHCP request interface module is coupled to a DHCP server for the protected network, and the DHCP request interface module obtains the logical address on the protected network from the DHCP server for the protected network.

39. The proxy device of claim 37, wherein the client compliance module is adapted to communicate with a compliance registration manager, the compliance registration manager storing compliance data for each of a plurality of clients.

40. The proxy device of claim 39, wherein the client compliance module retrieves compliance data for a particular client by querying the compliance registration manager using a MAC address associated with the client.

41. The proxy device of claim 37, wherein, responsive to the retrieved compliance data's indicating that the client is not in compliance with the set of security policies, the DHCP request interface module performs at least one of the steps:
  denying the client's DHCP request for an IP address;
  assigning the client a logical address on a restricted network.

42. The proxy device of claim 37, further comprising:
  a policy data module coupled to the client compliance module, the policy data module for storing the set of security policies;
  a policy manager module coupled to the policy data module, the policy manger module configured to send the set of security policies to the client upon the occurrence of at least one of:
    a DHCP request;
    a request for the security policies; and
    predetermined times.

43. A system comprising:
  a protected network having associated therewith a set of security policies;
  a compliance registration manager for storing compliance data associated with a plurality of clients, the compliance data for each client indicating whether the client is in compliance with the set of security policies, wherein the set of security policies includes at least one rule that evaluates a client's compliance based on a configuration of the client; and
  a DHCP proxy coupled to the compliance registration manager for retrieving compliance data therefrom, the DHCP proxy further coupled to the protected network, the DHCP proxy configured to intercept a DHCP request for an IP address from a particular client, and further configured to assign that client a logical address on the protected network upon the condition that the client is in compliance with the security policies.

44. The system of claim 43, further comprising:
  a client security policy verification module coupleable to the DHCP proxy and executable by a client, the client security policy verification module configured to determine the client's compliance with the set of security policies and communicate compliance data associated with that client to the compliance registration manager.

45. The system of claim 43, further comprising:
  a restricted network coupled to the DHCP proxy;
  wherein, responsive to a DHCP request for an IP address from a particular client, the DHCP proxy is configured to assign that client a logical address on the restricted network on the condition that the client is not in compliance with the security policies.

46. The system of claim 45, wherein the protected network and restricted network are virtual local area networks (VLANs).

* * * * *